United States Patent [19]

Hogan et al.

[11] Patent Number: 4,639,936
[45] Date of Patent: Jan. 27, 1987

[54] DATA TRANSMISSION SIGNAL APPARATUS

[75] Inventors: Thomas C. Hogan, Natick; Arnold Adelman, Berlin, both of Mass.

[73] Assignee: Prime Computer, Inc., Natick, Mass.

[21] Appl. No.: 579,093

[22] Filed: Feb. 10, 1984

[51] Int. Cl.⁴ .............................................. H04L 25/06
[52] U.S. Cl. ........................................ 375/36; 375/76; 307/542; 307/561; 178/69 D
[58] Field of Search ................. 178/63 R, 63 C, 63 E, 178/69 R, 69 D; 375/36, 76; 307/362, 363, 540, 549, 551, 318, 542, 555, 557, 561; 179/16 F, 174

[56] References Cited

U.S. PATENT DOCUMENTS

| | | | |
|---|---|---|---|
| 2,789,254 | 4/1957 | Bodle et al. | 307/318 |
| 3,303,425 | 2/1967 | Pendleton | 307/551 |
| 3,627,949 | 12/1971 | Krecic | 375/9 |
| 3,744,051 | 7/1973 | Sanders et al. | 340/347 DD |
| 3,757,138 | 9/1973 | Bhatia et al. | 307/235 R |
| 3,949,168 | 4/1976 | Taub | 375/36 |
| 3,972,020 | 7/1976 | Carroll et al. | 178/63 E |
| 3,993,953 | 11/1976 | Lender et al. | 375/18 |
| 4,158,863 | 6/1979 | Naylor | 361/56 |
| 4,178,619 | 12/1979 | Seiler et al. | 361/91 |
| 4,254,442 | 3/1981 | Dijkmans et al. | 361/56 |
| 4,280,221 | 7/1981 | Chun et al. | 375/17 |
| 4,288,751 | 9/1981 | Yoshida et al. | 307/561 |
| 4,339,727 | 7/1982 | Kage et al. | 375/76 |
| 4,340,922 | 7/1982 | Delaporte et al. | 361/91 |
| 4,350,906 | 9/1982 | Gillberg | 307/561 |
| 4,441,199 | 4/1984 | Chester et al. | 307/551 |

FOREIGN PATENT DOCUMENTS 1520632 8/1979 United Kingdom .

*Primary Examiner*—Benedict V. Safourek
*Attorney, Agent, or Firm*—Lahive & Cockfield

[57] ABSTRACT

The invention features a method and apparatus for improving data transmission in a transmission system having an analog signal transmitter directly connected along a transmission link to an analog signal receiver having a threshold element for detecting the signal. The invention features clamping voltages appearing at an input of the receiver symmetrically about a threshold value of the threshold element.

10 Claims, 2 Drawing Figures

DATA TRANSMISSION SIGNAL APPARATUS

BACKGROUND OF THE INVENTION

This invention relates to improved data communications in a transmission system having an analog signal transmitter; an analog signal receiver having a threshold element, such as a comparator, for receiving the transmitted signal; and a transmission link directly interconnecting the transmitter and the receiver. In particular, the invention relates to improved data communication in a transmission system using an interface conforming to the Electrical Industry Association (EIA) RS 232 standards as a transmission link.

A number of interfaces that conform to RS 232 standards are available in the commercial market. Such interfaces are well suited to some applications, but their use is limited, in some instances, by maximum cable length specifications. For example, in the above-described transmission system, the RS 232 cable is connected between a transmitter and a receiver having a comparator, which converts the analog signal transmitted by the cable into a "squared-up" digital signal. As the length of the RS 232 cable increases, the reliability of the analog to digital conversion decreases. Therefore, the RS 232 minimum signal transmission quality requirements dictate the maximum, allowable distance between transmitter and receiver. Two factors reducing conversion reliability, and therefore signal transmission quality, are cross-talk and phase margin error, both of which increase as the length of the RS 232 cable increases.

Cross talk, the undesired signals on one signal path that are caused by pulse signals in adjacent signal paths, appears as noise at the input of the comparator. Cross talk, which increases with increasing length of the RS 232 cable can be reduced by shielding the cable or by other equally costly techniques.

Phase margin, the difference in time between the expected and actual occurrence of the phase-delineating edge of the comparator output pulse, is a measure of the extent to which the operation of the comparator has been disrupted. One contributing factor to phase margin is the natural attenuation of high frequencies that occurs when transmitting a signal along an RS 232 cable. This results in a rounding of the transmitted pulse, and as the transmission cable lengthens, the rounding of the transmitted pulse increases. When an analog comparator receives the rounded pulses, a non-zero positive threshold will shorten positive pulses and lengthen negative ones. Increased "rounding" of the pulses on the cable thus worsens the phase margin.

Phase margin is also worsened, for example, when a string of pulses representing a single state, such as a series of "1" or "0" pulses in an NRZ data format, are transmitted along the RS 232 cable for a period of time, and then a pulse of the opposite value is transmitted. The cable, which acts like a capacitor, is fully charged to a maximum voltage by the earlier string, and cannot discharge quickly enough when the opposite state level is sent. As a result, the threshold comparator shortens the digital signal representing the new state and lengthens the pulse representing the old state. Therefore, the actual timing of the rising and falling edges of the digital signal is disrupted, phase margin decreases, and the reliability of the comparator is reduced.

Analog signal detection reliability is further effected when the comparator has a threshold value which is non-zero. Typically, a non-zero threshold is employed to avoid the effects of an open cable. However, a non-zero threshold tends to shorten the output pulse representing one digital state, lengthen the output pulse representing the other digital state, and therefore worsen phase margin.

Objects of the invention are therefore to improve the quality of analog signal transmission along interface cables, to increase the maximum length of transmission cables, to improve cross talk and phase margin effects in signals on transmission cables, and to improve analog signal detection.

SUMMARY OF THE INVENTION

The present invention relates to a data communications system and a method of transmitting analog signals from a transmitter, along a transmission link, to a receiver having a threshold element for receiving the signal. In general, the invention features clamping voltages appearing at an input of the receiver symmetrically about a threshold value of the threshold element. The clamping is accomplished by connecting a clamping device across the transmission link at a receiver connection. The clamping device is arranged to clamp the voltages between a minimum clamped voltage and a maximum clamped voltage that are set symmetrically about the threshold value.

In a preferred embodiment, the threshold value of the threshold element is set with a selector attached to the threshold element, and the minimum and maximum clamped voltage levels are, respectively, less than the high and greater than the low received voltage levels in an alternating pattern of binary digits transmitted by the transmitter along the link.

In a further preferred aspect of the embodiment, the clamping device is a voltage limiting circuit having first and second voltage clippers. The first clipper is arranged to limit voltages appearing at the receiver input to above the minimum clamped voltage, and the second voltage clipper is arranged to limit the voltages to below the maximum clamped voltage.

In a still further preferred aspect of the embodiment, the voltage limiting circuit comprises first and second zener diodes connected in opposing series connection across the transmission link. The first zener diode has a first zener breakdown voltage essentially equal to the minimum clamped voltage, and the second zener diode has a second zener breakdown voltage essentially equal to the maximum clamped voltage.

As will be apparent from the description below, a data transmission system following the method and having the apparatus of the present invention has improved data signal transmission quality. Analog to digital signal detection is improved because phase margin is reduced by the symmetrical clamping, and crosstalk is inhibited by the low cable impedance that the "turned-on" diodes present. Since signal transmission quality is improved, the distance over which the transmission can occur may be increased, and the link between transmitter and receiver may be lengthened.

Further, the apparatus of the present invention is simple and inexpensive to manufacture and install, and the process, once the threshold value is established, is efficient and easy to implement.

DRAWINGS

Other features, objects, and advantages of this invention will become more apparent from a reading of the following claims and detailed specification taken with the drawings.

FIG. 1 is a schematic diagram of a data transmission system embodying the invention; and FIG 2 is a more detailed schematic diagram of the clamping device shown in FIG. 1.

DESCRIPTION OF THE PREFERRED EMBODIMENT

Structure

Figure 1:
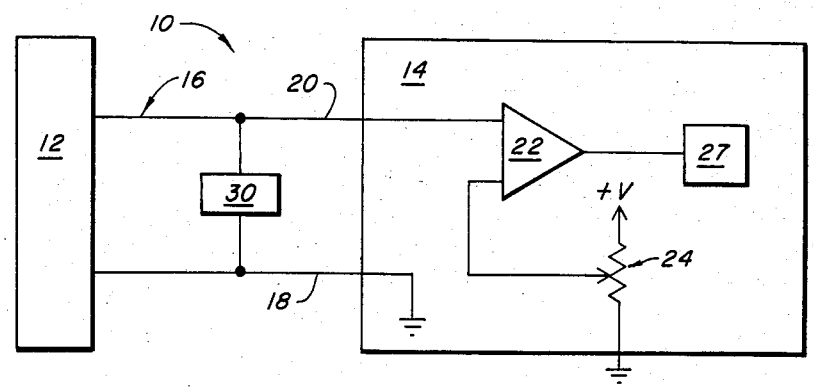

There is shown in FIG. 1 a data communication transmission system 10 having an analog signal transmitter 12, an analog signal receiver 14, and a transmission link 16 directly interconnecting the transmitter 12 and the receiver 14. The link 16 is an interface cable conforming to EIA RS 232 standards, for transmitting analog signals representative of patterns of binary bits.

As illustrated, the cable link 16 has a grounded line 18 and a line 20 connecting the transmitter 12 to a comparator 22, which is arranged within the receiver 14 to receive the analog signals transmitted from the transmitter 12 along the cable link 16. The comparator 22, which functions as a threshold element to convert the analog signal into a "squared-up" binary signal, has a selector 24 for setting the threshold value of the comparator 22. The "squared-up" binary signal output of comparator 22 is directed to a receiver circuitry 27 which can be, for example, any receiver circuitry making use of the binary signal.

Figure 2:
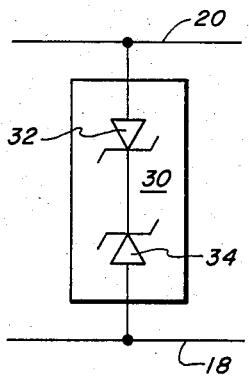

The link 16 has a clamping device 30 connected across the lines 18, 20 near the receiver 14. As best seen in FIG. 2, the clamping device 30 is a voltage limiting circuit, having a first zener diode 32 connected in opposed series connection with a second zener diode 34. The first zener diode 32 has a zener breakdown voltage $V_{Z1}$ that is essentially equal to a minimum clamped voltage $V_L$, and the second zener diode 34 has a zener breakdown voltage $V_{Z2}$ that is essentially equal to a maximum clamped voltage $V_H$.

$V_H$ is selected to be equal to or slightly less than the high voltage level in an alternating pattern of binary digits transmitted by the transmitter 12 along a maximum length of the cable 16, and thus to be greater than the minimum cable voltage representative of a high logic level.

Operation

In use, the selector 24 is manipulated to set a threshold value $V_T$ of the comparator 22 that is optimum for detecting pulses on the cable 16. As noted above, typically the threshold value is offset from zero volts to avoid the effects of an open cable. The minimum clamped voltage $V_L$ and the maximum clamped voltage $V_H$ can be determined to be symmetrical about $V_T$, with $V_H$ approximately equal to the maximum voltage level found in a string of alternating cable pulses and with $V_L$ greater than the minimum voltage level of the string.

As analog signals are transmitted along the cable 16, the clamping device 30 limits the voltage levels of the signals to the range of voltages between $V_L$ and $V_H$. Specifically, the clamping device 30 acts as a double-ended voltage limiting circuit having two voltage clippers, zener diodes 32, 34, connected in opposing series connection across lines 18, 20.

The first voltage clipper, zener diode 32, limits voltages appearing at the input of the receiver 14 to values above $V_L$, the minimum clamped voltage (a negative voltage). As voltages on the cable 16 drop below $V_L$, the first zener diode 32 operates in its breakdown region, the second zener diode 34 being conductive, thus supplying the input of receiver 14 with a voltage essentially equal to $V_L$.

The second voltage clipper, zener diode 34, limits voltages appearing at the input of receiver 14 to values below $V_H$, the maximum clamped voltage. As voltages on the cable 16 exceed $V_H$, the second zener diode 34 operates in its breakdown region, the first zener diode 32 being conductive, thus supplying the input of the receiver 14 with a voltage essentially equal to $V_H$.

When the zener diodes 32, 34 are both conducting, they lower the impedance across the cable 16, making it more difficult for cross talk to couple onto the cable. Therefore, cross talk on the cable is reduced, and transmission quality is improved.

From the above, it can also be seen that clamping the voltages of signals on the cable symmetrically about the threshold value of comparator 22 increases the amount of phase margin in the output of the comparator 22. Specifically, clamping the voltages on line 22 between the chosen maximum and minimum voltages eliminates the extreme voltage levels on the cable and, therefore, reduces the amount of variation possible in the average voltage level on the line 20. Thus, a limit is imposed on the amount of "baseline rideup" and "baseline ridedown" that can occur on the line 20. Further, the reduced voltage range means that, even for an alternating bit stream, the voltages received at the comparator 22 will reach their expected maximum and minimum values.

Further, clamping the voltages about $V_T$ biases the average voltage level toward $V_T$. Since $V_T$ is also the threshold value of the comparator 22, the effects of comparator timing disruptions arising from asymmetrical biasing are reduced in the output of the comparator 22.

Since clamping the voltage on the cable 16 symmetrically about the threshold value of the receiver threshold element (the comparator 22) with clamping device 30 reduces cross talk and increases phase margin, the reliability of the analog signal detection in the receiver 14 is improved, resulting in overall improved transmission quality over the link 16.

Since transmission quality is improved and the maximum allowable distance is dictated by the minimum transmission quality requirements in the RS 232 standards, the maximum distance between the transmitter 12 and the receiver 14 can be increased. In fact, the length of link 16 in the data transmission system 10 can be doubled according to the invention, without incurring error rates in excess of typical RS 232 operation.

Thus, it can be seen that improved transmission quality and increased transmission distance can be achieved with the addition of an inexpensive clamping device embodying the present invention.

Additions, subtractions, deletions, and other modifications of the invention will be obvious to those practiced in the art and are within the scope of the following claims.

What is claimed is:

1. In a data communication transmission system having an signal transmitter; an analog signal receiver having a threshold element, with a selected threshold value, for receiving a transmitted signal said transmitted signal including a succession of interspersed relatively high and relatively low peak voltages and having transitional voltages between said high and low peak voltages; and a transmission link directly interconnecting said transmitter and said receiver;

a data transmission signalling apparatus comprising voltage clamping means connected directly across said transmission link at a receiver connection for clamping voltages appearing at a receiver input between a minimum clamped voltage less than a minimum expected voltage equal to the lowest expected relatively high peak voltage appearing on the transmission link at the receiver and a maximum clamped voltage greater than a maximum expected voltage equal to the hightest expected relatively low peak voltage appearing on the transmission link at the receiver, said minimum and maximum clamped voltages being set symmetrically about said threshold value.

2. The apparatus of claim 1, further comprising selecting means for setting said threshold element to said selected threshold value.

3. The apparaus of claim 1, wherein said minimum clamped voltage level and said maximum clamped voltage level essentially are, respectively, no less than the low and no greater than the high voltage levels in an alternating pattern of binary digits transmitted by said transmitter along said link.

4. The apparatus of claim 1, wherein said clamping means comprises a voltage limiting circuit having a first and second voltage clipper, said first voltage clipper arranged to limit said voltages appearing at said receiver input to above said minimum clamped voltage, and said second voltage clipper arranged to limit said voltages appearing at said receiver input to below said maximum clamped voltage.

5. The apparatus of claim 4, wherein said first voltage clipper is a first breakdown diode having a first breakdown voltage essentially equal to said minimum clamped voltage, and said second voltage clipper is a second breakdown diode having a second breakdown voltage essentially equal to said maximum clamped voltage.

6. The apparatus of claim 5, wherein at least one of said breakdown diodes comprises a zener diode.

7. The apparatus of claim 5, wherein said breakdown diodes are connected in opposing series connection across said transmission link.

8. In a data communication transmission system having a signal transmitter, an signal receiver having a threshold element, with a slected threshold value, for receiving a transmitted signal said transmitted signal including a succession to interspersed relatively high and relatively low peak voltages and having transitional voltages between said high and low peak voltages; and a transmission link directly interconnecting said transmitter and said receiver;

a data transmission signalling apparatus comprising selecting means for setting said threshold element to said selected threshold value, and a voltage limiting circuit connected directly across said transmission link at a receiver connection for clamping voltages appearing at a receiver input between a minimum clamped voltage less than a minimum expected voltage equal to the lowest expected relatively high peak voltage appearing on the transmission link at the receiver and a maximum clamped voltage greater than a maximum expected voltage equal to the highest expected relatively low peak voltage appearing on the transmission link at the receiver, said minimum and maximum clamped voltages being symmetrically set about said threshold value and being essentially, respectively, above the low and below the high received voltage levels in an alternating pattern of binary digits transmitted by said transmitter along said link, said circuit having a first and second zener diode connected in opposing series connection across said transmission link, said first zener diode having a first zener breakdown voltage essentially equal to said minimum clamped voltage and that is arranged to limit said voltages appearing at said receiver input to above said minimum clamped voltage, and said second zener diode having a second zener breakdown voltage essentially equal to said maximum clamped voltage and that is arranged to limit said voltages appearing at said receiver input to below said maximum clamped voltage.

9. A method of transmitting signals from a transmitter along a transmission link to a receiver having a threshold element for receiving said signal, said transmitted signals including a succession of interspersed relatively high and relatively low peak voltages and having transitional voltages between said high and low peak voltages, comprising the step of directly clamping voltages appearing at an input of said receiver symmetrically about a threshold value of said threshold element whereby the minimum clamped voltage is greater than the maximum expected relatively low peak voltage appearing on said link at a receiver end thereof and the maximum clamped voltage is less than the minimum expected relatively high peak voltage appearing on said link at said receiver end thereof.

10. The method of claim 9, further comprising the steps of selecting said threshold value, and providing a minimum clamped voltage and a maximum clamped voltage at said receiver input that essentially are, respectively, greater than the low and less than the high voltage levels in an alternating pattern of binary digits transmitted by said transmitter along said link.

* * * * *